United States Patent
Heubach (10) Patent No.: US 7,824,487 B2
(45) Date of Patent: Nov. 2, 2010

(54) RUTILE-BASED PIGMENT AND A METHOD FOR THE PRODUCTION THEREOF

(75) Inventor: Rainer Heubach, Grossgmain (AT)

(73) Assignee: Heubach GmbH, Langelsheim (DE)

( * ) Notice: Subject to any disclaimer, the term of this patent is extended or adjusted under 35 U.S.C. 154(b) by 0 days.

(21) Appl. No.: 11/676,804

(22) Filed: Feb. 20, 2007

(65) Prior Publication Data

US 2007/0199479 A1 Aug. 30, 2007
US 2008/0216711 A2 Sep. 11, 2008

Related U.S. Application Data (63) Continuation of application No. PCT/EP2005/008892, filed on Aug. 16, 2005.

(30) Foreign Application Priority Data

Aug. 20, 2004 (DE) .............. 10 2004 040 384

(51) Int. Cl.
- C09C 1/36 (2006.01)
- C01G 23/00 (2006.01)
- C01G 27/00 (2006.01)
- C01G 23/02 (2006.01)
- C01G 23/047 (2006.01)

(52) U.S. Cl. .......... 106/436; 423/76; 423/82; 423/492; 423/610

(58) Field of Classification Search .......... 106/436; 423/76, 82, 492, 610
See application file for complete search history.

(56) References Cited

U.S. PATENT DOCUMENTS

| | | | | |
|---|---|---|---|---|
| 3,661,522 A | * | 5/1972 | Colombo et al. | 423/613 |
| 3,875,286 A | * | 4/1975 | Robinson et al. | 423/86 |
| 3,883,636 A | * | 5/1975 | Cole et al. | 423/74 |
| 3,923,968 A | * | 12/1975 | Basque et al. | 423/611 |
| 5,171,631 A | * | 12/1992 | Adkins | 428/328 |
| 5,653,793 A | * | 8/1997 | Ott et al. | 106/437 |
| 5,759,256 A | * | 6/1998 | Stramel | 106/439 |
| 6,410,614 B1 | * | 6/2002 | Jones et al. | 523/205 |
| 6,706,341 B1 | * | 3/2004 | Schnitzel et al. | 428/32.69 |
| 6,713,038 B2 | * | 3/2004 | Zhou et al. | 423/610 |

FOREIGN PATENT DOCUMENTS

| | | | |
|---|---|---|---|
| GB | 566920 | * | 1/1945 |
| WO | WO/2004/078852 | * | 9/2004 |

OTHER PUBLICATIONS

John Maloney, section entitled "Titanate Pigments; Colored Rutile, Priderite, and Pseudobrookite Structured Pigments", of the book "High performance pigments", 2002, Wiley-VCH, pp. 53-73.*

* cited by examiner

Primary Examiner—Michael A Marcheschi
Assistant Examiner—Shuangyi Abu Ali
(74) Attorney, Agent, or Firm—Fish & Richardson P.C.

(57) ABSTRACT

The invention covers a fine-particle, brilliant and strongly hiding rutile-based pigment that is devoid of any metal or reactive metal compounds relevant to mill abrasion detectable by application technology but whose particle-size in terms of particle diameters ranges from 50 to 1000 nm, for mono-, bi-, tri- or oligo-modal size distribution and a primary maximum ranges from 230 to 400 nm, wherein optionally for a bi- or poly-modal frequency distribution, a secondary maximum is less than 25% of the primary maximum between 400 and 1000 nm. The process for producing said pigment comprises treating an inorganic mixed-phase rutile structured oxide pigment by high-speed grinding in suspension in a ball grinding mill provided with a mechanically and chemically resistant coating until said particle-size and a substantially isometric rounded particle shape are attained. The invention optionally provides for viscosity adjustment and surface conditioning of the pigment. The inventive pigment differs from prior art by improved gloss, low whiteness or reduced whitening, relatively high hue saturation, by extremely high hiding power which had been unattainable in said class of products up to now and exhibits a low photoactivity with respect to known fine-particle rutiles. In practice neither abrasivity nor interaction of possible grinding residues with an application matrix are observed.

28 Claims, 4 Drawing Sheets

RUTILE-BASED PIGMENT AND A METHOD FOR THE PRODUCTION THEREOF

RELATED APPLICATION

This is a U.S. national phase continuation application of PCT application PCT/EP2005/008892 filed Aug. 16, 2005, published Mar. 2, 2006 under WO 2006/021354, and which claims the priority of German Application No. 10 2004 040 384.8, filed Aug. 20, 2004. The prior application is hereby incorporated by reference, in its entirety.

FIELD OF THE INVENTION

The invention relates to a fine-particle, bright, and highly opaque rutile-based pigment without contamination by reactive metal compounds and to a method for the production of such pigments.

BACKGROUND OF THE INVENTION

Nickel antimony titanium yellow pigments are by nature pale yellow pigments with high opacity. Overdyeing, i.e., over-coloring, with high quality organic pigments facilitates to obtain highly saturated full-tone colors covering the entire color spectrum, with the exception of blue and violet hues. This overcoloring results in a synergy between the relatively high opacity of the cost-efficient nickel antimony titanium yellow and the high color intensity of the organic overcoloring pigments, which are generally quite expensive.

This effect can also be obtained using titanium white; however, overcoloring always leads to greater brightening, that is, to less saturation, due to the high whitening power of titanium white pigments. Another disadvantage of titanium white overcoloring is the photocatalytic effect of titanium white pigments, resulting in a sharp decrease of light and weather-fastness of the expensive organic colorants. Consequently, fully saturated hues based on titanium white pigment "age" some four-times faster than mixtures of the same organic color components with nickel antimony titanium yellow.

In the past, this decisive use of nickel antimony titanium yellow was rarely used because the nickel titanium pigments currently available on the market are abrasive (grain-hard and sharp-edged), have poor gloss, and are inferior in terms of hiding power compared to titanium white. Moreover, the following economic background may be considered:

Nickel antimony titanium yellows account for a relatively small market shares among titanium pigments, as the following figures demonstrate: titanium white world market: 4,000,000 tons, titanium yellow world market: 20,000 tons, of which chromium antimony titanium yellow: 16,000 tons, of which nickel antimony titanium yellow: 4,000 tons.

The annual tonnage of chromium antimony titanium yellow is disproportionate to that of nickel antimony titanium yellow. As colored pigments, nickel antimony titanium yellows themselves do not provide for a satisfactory option to replace 100,000 annual tons of lead sulfochromate yellow and molybdate red pigments pursuant to the hazardous materials laws and environmental protection laws that have become increasingly stringent since 1980. The reason for this is the deficiencies, considered unchangeable, that are manifested in particular by the insufficient opacity, compared to titanium white and to chromium and cadmium yellows and by inadequate gloss and high abrasiveness.

These three deficiencies are the result of one and the same cause, specifically a mean particle size, primarily of nickel antimony titanium yellow pigments, that is too large at an average of 1000-2000 nm in the best qualities found on the market, while the optimum opacity of a pigmentary coloring agent is attained with a particle size of 300 nm and with optimized grain shape and surface. A pigment loses about 20% of its opacity when the mean particle diameter exceeds 500 nm. Finer commercial types according to the prior art are regularly slightly doped and greatly whitened. In addition due, to their high grinding costs expensive, highly doped, highly-fired products are unknown because they are inconsistent in terms of coloristic assessment.

Surface enlargement below a mean particle diameter of 300 nm should be avoided for color pigments because they become transparent when their size drops below a particle diameter of about half the wavelength of the light reflected by them, which is undesirable for applications of nickel antimony titanium yellow pigments. As the hardness of the particles is high, abrasiveness increases for spiky and sharp-edged particles. The object is therefore also to produce isometric particles (rhombi) that are chamfered or have beveled flattened or rounded corner zones. This cannot be achieved by coating the particles in accordance with DE-A-2 936 746 that acts in cooperation with surfactant agents like a slip agent and which prior art additionally teaches a separate processing step and use of auxiliary agents as the subject matter of the invention.

Nevertheless, as a further object set herein for avoiding color effects under different types of illumination (metamerism), a relatively smooth surface and also approximate uniformity of the (projected) edge lengths should be obtained; a spherical shape is unattainable under any conditions, however.

Taking the aforesaid into account, the relevant prior art shall be addressed:

In the past, a mean particle size of 300 nm has not been reached by any manufacturer with satisfactory results for highly doped and/or fully annealed nickel or chromium antimony rutile yellow pigments ($TiO_2$<87%). Patent DE-A-3 202 158 describes in particular chromium antimony titanium yellows. In fact, the small dopings described therein inter alia with antimony and chromium at low firing temperatures<1000° C. with subsequent wet grinding in bead mills lead to a pigment with a narrow particle size distribution and corresponding fineness, sometimes also due to the softer grain of the mixed phase oxide pigments described therein. However, there are limits for hue control depending on how the reactive iron content will assume uncontrollable amounts if a non-metallic mill with resistant lining is not used as it is inventively in this case. Still, with a product according to the prior art in DE-A-3 202 158, increased photoactivity, and with appropriate very fine grinding, a high degree of whitening must be accepted. If iron abrasion is permitted in the milling process, the material will gray and results in interferences in PVC-based matrices. This is true even for mixed phase rutile-based oxide pigments that contain iron bound as a non-reactive component in the crystal lattice of the rutile, as in example 3 of DE-A-3 202 158.

In accordance with the teaching of DE-A-3 202 158, a coloristically favorable particle size distribution is attained when low doping, relatively low firing temperature, and wet milling are combined. However, this quoted application does not provide any information on particle size distribution and does not specify the type of milling precisely.

In the case of titanium dioxide, synthesis by the chloride process with the adjustment of the $TiCl_4$ burner and blending-in agglomeration-preventing sand during the subsequent cooling and conveying process has already found a practical path for adjusting optimized particle size distributions ($d_{50}$=approx. 280 nm for light of 550 nm wavelength) (see inter alia: Winkler, J: "Titanium Dioxide", Hannover: Vincentz, 2003; ISBN 3-87870-148-9; pp. 35-37; 51-58). Although in this method small quantities of aluminum chloride are metered to the titanium tetrachloride for "rutilization", it being unresolved how many lattice places in the rutile are really occupied by aluminum ions, this method is not promising e.g. for application of antimony and nickel chlorides to titanium tetrachloride upstream of the burner. Separation and inhomogeneous volatility of metal chlorides and metal oxychlorides prior to the lattice insertion of the metal ions is observed. A lengthy subsequent calcination period leads to reagglomeration.

The Ishihara Company is particularly active in the prior art. This is demonstrated by worldwide patent applications. These include for instance EP 1 245 646 (A1, corresponds to U.S. Pat. No. 6,576,052), in which a fine-particle $TiO_2$ obtained from the chloride process, already 100 to 400 nm mean particle size, is re-ground to a corresponding fine primary particle size during a siloxane post-treatment and coating with aluminum phosphate using a jet mill. According to EP-A-1 273 555 (corresponds to U.S. Pat. No. 6,616,746), the same grain fineness of the raw pigment for coating is used with polyhydric alcohols and hydrolyzed amino silanes and/or aluminum hydroxide. The procedure is the same as the foregoing. Good dispersibility of the photostabilized products are claimed. For grinding, the pigment is comminuted after or during addition of the coating and stabilization reagents at a temperature of 120 to 300° C. in a jet mill or a similar "fluid energy mill" that permits a hydrolysis reaction of the amino siloxanes and other reactive components and prevents any reagglomeration during the coating process. This patent relates only to $TiO_2$ in rutile modification (which is preferably formed by the additions of aluminum). After working up the batch, the coating is principally to act in a manner that prevents agglomeration and is photostabilizing, i.e. lastingly moderates the photocatalytic effects of the pigment.

Wet grinding of rutiles, that is also rutile yellow pigments, in high-intensity bead mills is prior art e.g. in accordance with DE-A-3 930 098. These are sold by a number of different specialty companies.

The option provided e.g. in DE-A-4 106 003 to obtain an a priori finer grain structure and thus save a grinding process by "alloying" the firing batch for a rutile brown pigment with small quantities of cerium, inter alia, cannot be performed with chromium and nickel titanium pigments due to the brighter hues that are more sensitive to fluctuations in doping.

Basically many companies seem to prefer wet precipitation of a precursor to the actual "hot" synthesis of the pigment which precursor is imprinted with the grain size and structure distribution and thus the fineness, which is maintained at this predetermined level until after calcination and final fine grinding. The hydroxyl groups on the surface of the freshly precipitated oxides and hydroxides represent a good promoter for the diffusive penetration of the rutile lattice with its numerous vacancies with foreign metal ions after evaporating the water above 150° C. However, the finer grain sizes possible due to the lower firing temperature are not yielding reproducible color intensity. Diameters still fluctuate between 800 and 1200 nm.

Proceeding from the prior art described in the foregoing, the object of the invention was to obtain a fine-particle, brilliant rutile-based pigment that is distinguished by superior opacity, gloss, and lower abrasiveness. Moreover, it should have the smallest possible or no iron content, for instance in the low ppm range in any case. Moreover, the invention should provide a method with which such a pigment can be produced in a particularly economical manner.

BRIEF DESCRIPTION OF THE INVENTION

The object is inventively attained by a fine-particle, bright, and highly opaque rutile-based pigment that is characterized in that it has a particle size distribution with diameters between 50 and 1000 nm and for mono-, bi-, tri-, or oligomodal size maxima distributions features a primary maximum between 230 and 400 nm, whereby for a bi- or oligomodal size distribution accordingly a secondary maximum occurs, at less than 25% of the primary maximum, between 400 and 1000 nm, in particular between about 400 and 900 nm. It is particularly preferred that the claimed primary maximum is between 280 and 340 nm and/or the secondary maximum is between 480 and 800 nm. Furthermore, it is preferred when the mean particle diameter of the pigment is between 80 and 1000 nm, in particular between 80 and 900 nm. The range of 120 to 600 nm is very particularly preferred. Moreover, in individual cases it is advantageous when the pigment has an asymmetrically shaped monomodal frequency distribution for the particle diameter with a maximum between 250 and 390 nm, in particular between 280 and 340 nm.

As is consequently evident, the particle size for the type described should be considered an essential feature of the present invention. This shall be explained in greater detail in terms of the technology. Surprisingly, it has been demonstrated that the sharp particle size maximum must sit on a "base" in the distribution curve, which may also feature secondary maxima of up to 15%, preferably 5%. Without this explanation being limiting or exhaustive, this special embodiment of a sharply asymmetrical, bi- or oligomodal particle distribution or a "deep drag" for attaining optimum brightness and saturation may be tracked down to the need to provide optimum space occupation in the matrix by approaching a certain portion of the pigment to the "Fuller curve". As long as they remain a minority, the finest fraction (diameters 150 nm<D<250 nm) may certainly cause the absorption edge of the pigment to be steeper due to stronger absorption, which likewise causes intensification of Raleigh scattering, resulting in improved brilliance.

The texture must also receive the required "polishing" in order to permit smooth, optimized interaction with a matrix, improve gloss, and protect usual application tools. This can be achieved efficiently by adding auxiliary agents in the same work step of the inventive method, which will be described subsequently. The particle surface is ground to a rounded shape using the selected method and appropriate additives and coatings, which helps moderating the abrasiveness of the particles and improves the flowability of highly-pigmented preparations in later applications. The tendency of fine rutile pigments to agglomerate is thus effectively addressed during creation, i.e., in the grinding batch, to be described further below.

In particular, the invention refers to the following pigments: A highly doped, fully annealed nickel antimony rutile yellow, a chromium antimony rutile yellow that is just as highly doped and fully annealed, and a titanium dioxide, preferably made of synrutile precursors, each in rutile structure, that is just annealed and only weakly doped with foreign elements.

The inventive fine-particle, brilliant, and highly opaque rutile-based pigments also result in excellent gloss values. A pigment in accordance with the invention is distinguished in that it has a 200 reflectometer gloss value of at least 42 according to DIN 67 530 and a 60° reflectometer gloss value of at least 80, in particular a 20° reflectometer gloss value of at least 50, in particular 55 to 70, and a 60° reflectometer gloss value of at least 83, in particular 83 to 93. The excellent hiding power of the claimed pigments is particularly valuable. These are distinguished in that the hiding power in accordance with DIN 55 987 is greater than 100% relative to a standard rutile pigment comparison substance, in particular is greater than 110%, and in particular is between 115 and 130%. Neither dry grinding used today as the state of the art nor conventional sand/bead mills are suitable for producing the inventive pigment of the type characterized; these known methods and processes merely yield particle diameters of the 600 through 1200 nm range at best.

The present invention also proves valuable because the accordingly obtained products do not feature an evenly distributed increase of remission over the entire wavelength spectrum, but feature a maximum in the yellow range of the visible spectrum (approximately 570 to 600 nm) instead. This also prevents the $b^*$ values from decreasing excessively with the unwanted inherent increase in brightness (i.e., the non-wavelength-specific remission).

BRIEF DESCRIPTION OF THE DRAWINGS

Other objects and advantages of the invention will become more apparent upon reference to the following Specification and annexed drawings, wherein "SEM" means "Scanning Electron Microscope" or "scanning electron microscopic", and DIN means "German Industry Standard", and in which:

FIGS. 2-4 represent comparative SEM views of pigment particles:

DETAILED DESCRIPTION OF THE INVENTION

The subject matter of the present invention relates to a method or process producing the inventive pigmentary matter. It is characterized as an inorganic mixed-metal, single-phase oxide pigment with a rutile structure, treated by high-speed grinding of the aqueous suspension in an agitator ball/bead mill with abrasion-resistant lining, until a fineness defined by particle size distribution described hereinabove has been attained. Preferably grinding buckets and grinding tools feature a wear-resistant and inert coating. Preferably, this resistant lining material for the (high-speed) agitator ball mill is an inert and wear-resistant ceramic material, particularly a heat-conductive ceramic material to assist cooling of the device. Alternatively a preferred resistant lining material for the agitator ball mill is an inert and wear-resistant polymer plastic, e.g. polyurethane.

Additional information regarding the method. It is preferred that resistant grinding pearls with a diameter of about 0.2 to 1.7 mm, in particular from about 0.5 to 1.2 mm, are used in the milling device in an analogous manner for coating. The temperature during fine grinding is preferably maintained between about 20 and 90° C., in particular between 40 and 60° C. Moreover, it is deemed useful that fine grinding is performed according to the inventive method using a recirculation process, the mean dwell time of the ground material in the agitator ball mill being 4 to 44 min, in particular 10 to 18 min. Advantageously, the circumferential speed of the rotor in the agitator ball mill is 5 to 19 m/s, in particular 10 to 12 m/s. In addition, in the framework of the invention the filling degree may be adjusted advantageously. It is preferred that the filling level of the agitator ball mill with grinding bodies is about 60 to 90 vol. %, in particular about 70 to 80 vol. %.

In individual instances, it may be required to prefer a pre-comminution step upstream of the inventive method. This may occur in a ball mill, likewise made of resistant material, metal contact with the ground material being largely prevented. This is one reason that iron content is largely avoided in the inventive pigments. In other words, this means that the iron content of the inventive process is determined solely by the specification of the raw materials and therefore in any case remains in the ppm range.

Regarding the history of the inventive method it should be stated: After initial experiments with highly doped highly fired nickel titanium yellow as for the teaching of DE-A-3 202 158 with high-speed agitator ball mills failed due to unsatisfactory color consistency, it was surprisingly found that the grinding efficiency improved dramatically in connection with chemically and mechanically resistantly lined agitator ball mills and fine ceramic grinding bodies. Preferably the lining should be non-metallic. It could comprise plastic, but it could also comprise ceramic.

Therefore a sharp particle size distribution with about 320 nm mean particle diameter, close to the optimum, can be attained with relatively low grinding effort, the particle size distribution additionally featuring a steep incline that conforms to the objective.

The described refitting of the agitator ball mill, with the metal-free lining, was thus proving important for conducting the new inventive wet milling method successfully. The inventive pigments and also the inventive method are of particular value, evidenced by numerous advantages: For instance, the grinding efficiency can be promoted using the surfactant polymers, mentioned in the foregoing, specifically using differently substituted polysiloxane compounds and polar substituted long-chain alkanes. The polysiloxanes primarily effect hydrophobization of the per se polar surface of the inorganic pigment particle. During subsequent application in nonpolar binding agents (solvent-containing resins) or other polymer materials (polyolefins), hydrophobization of the pigment surface leads to clearly more rapid rewetting and thus to less wear. Under the selected (aqueous) grinding conditions, highly disperse oxides of silicon or aluminum prove to be the solution to hydrodynamic problems, in addition to adjusting an optimum ionic strength and therefore viscosity with a salt of an oxygen acid of for instance sulfur or phosphorus. In applying the aforesaid compounds it is therefore possible to obtain particularly advantageous control "tools" when optimizing the inventive method.

Figure 5:
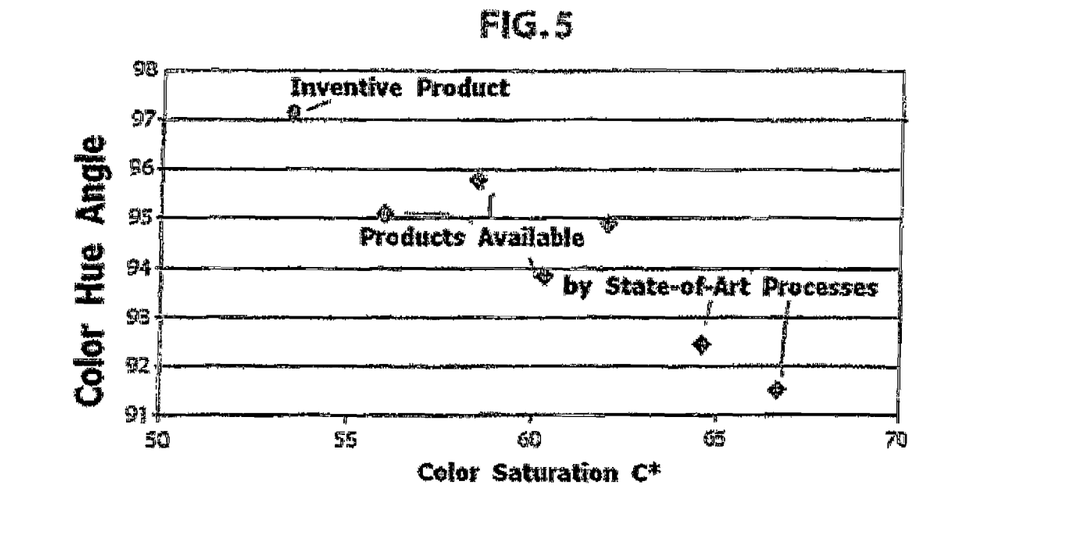
FIG. 5 is a graphic comparison of the hue location of an inventive product (marked by a solid round dot) with commercial products (marked by block lozenges) obtained according to prior art methods, in terms of CIELAB color space specifications acc. to DIN 5033.

The present invention overcomes the deficiencies of prior art nickel antimony titanium yellow pigments to yield, optionally using a modified finish process, yellow pigments with substantially improved opacity and substantially improved gloss that is the equivalent of that of titanium white; at the same time the color intensity is improved compared to low-doped rutiles that are annealed at lower reaction temperatures, which is clearly evidenced by FIG. 5. In accordance with the object, the invention thus initiates a new scope of application for highly doped rutile pigments.

The advantages of the inventive pigment can be summarized as follows: It is distinguished from the prior art product by improved gloss, low whiteness/less brightening, relatively high color saturation, and extremely high hiding power unavailable in the past in this class of material, combined with low photoactivity for fine-particle rutiles compared to the prior art. Furthermore, in practice it does not exhibit any disadvantageous abrasiveness or any interaction of any grinding residues with the application matrix. In particular it is essentially free of reactive metals or metal compounds, in particular free of reactive iron compounds.

Figure 1:
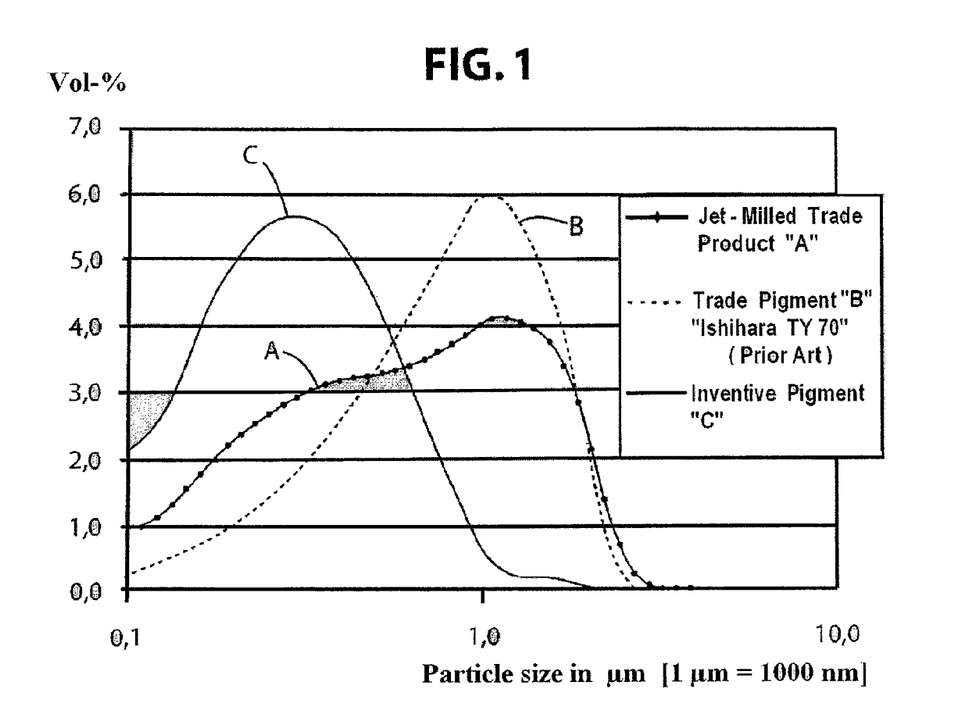
FIG. 1 displays a graphic comparison of particle size distribution of state-of-art-traded nickel antimony-titanium rutile yellow pigments (jet-milled, "A") and "Ishihara TY70" (conventionally ground; "B"), with the inventive product ("C") as exemplified by a superfine nickel-antimony-titanium rutile yellow pigment, wet-milled by a micromedia mill according to the inventive process with stabilized zirconia beads of 1.2 mm diameter.

The uniform solid line C in FIG. 1 that represents the invention demonstrates a clear leap in quality compared to the products of the ribbed and dashed lines. The optimum grain size distribution in terms of the primary maximum, between about 230 and 400 nm, is believed one reason for the improved properties observed.

Figure 3:
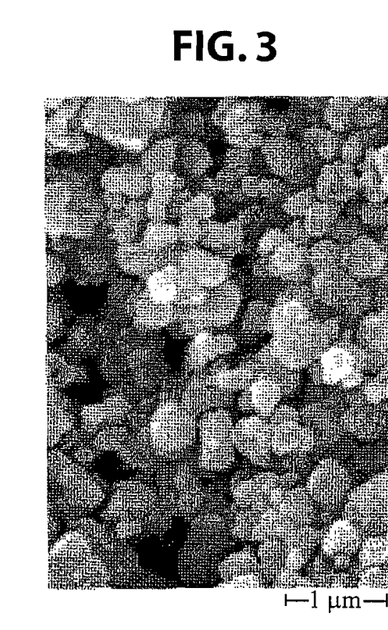
FIG. 3 is an SEM view of commercially available pigment type "A"
Figure 4:
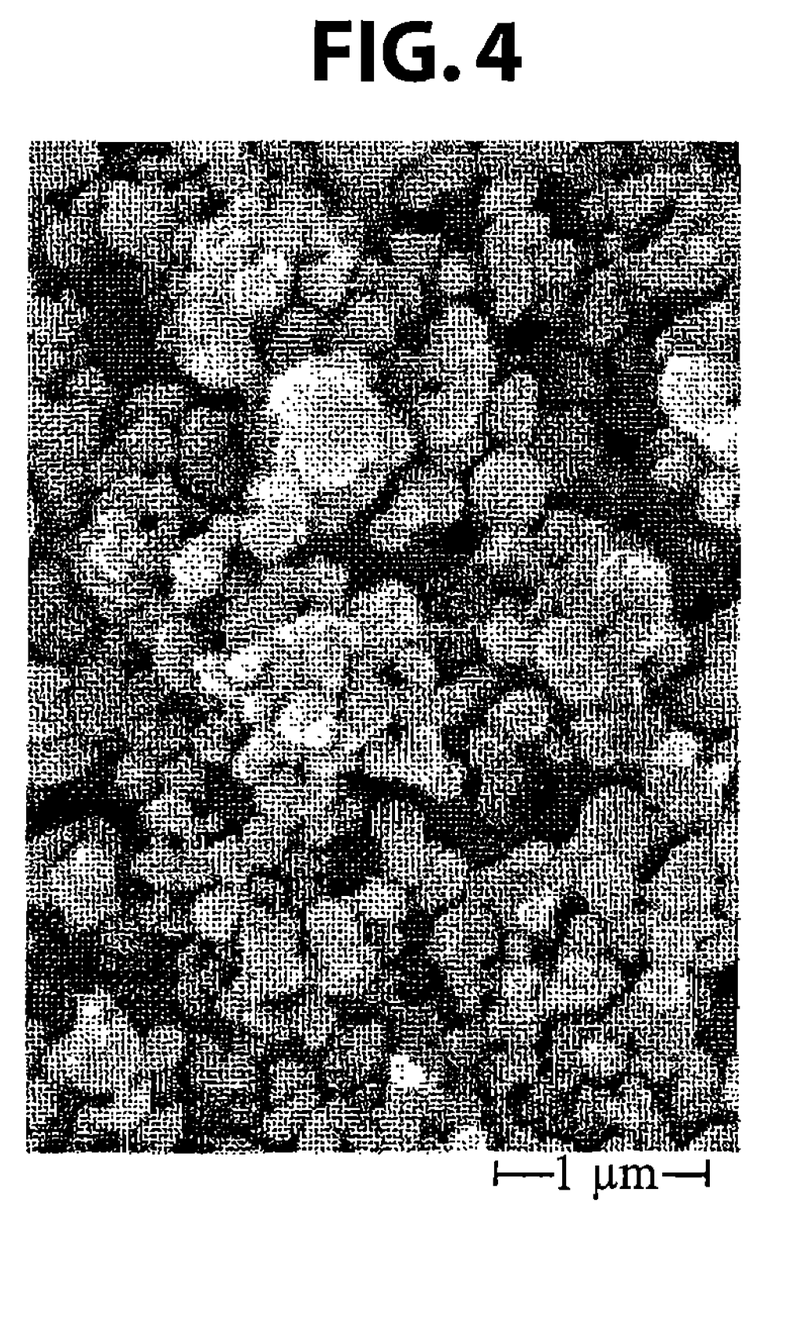
FIG. 4 is an SEM view of an inventively fine nickel antimony titanium rutile yellow pigment.

As compared to the conventional product that is usually jet milled, an example of which is shown in FIG. 3, the product made in accordance with the invention as shown in FIG. 4 has a smaller particle size.

FIG. 5 shows the characteristic location of nickel antimony rutile yellow in the CIELab color space (determined according to DIN 5033, Part 3). The solid dot is the product of invention and the lozenges are prior art products. Obviously the inventive products occupy a new color location compared to the products according to the prior art. This shows that the product of the invention is a product that differs from prior art products. The invention expands the spectrum of stable pigments with a yellow hue. It is therefore of particular advantage for nickel antimony rutile yellows that the CIELab color location has a color saturation C* of 52 to 55 at a color hue angle h of 96 to 98° according to DIN 5033.

The invention shall be explained in greater detail using the following examples, although these shall not be construed as a limitation.

EXAMPLE 1

Step 1: Pre-Comminution

It is advantageous to have a conventional pre-comminution step upstream of fine grinding in order to limit the duration of grinding. This can occur according to the following variations, and the ground material is then fed directly to the inventive process (these are actually processes in accordance with the prior art, which are only included for the sake of completeness and to demonstrate the general applicability of the invention):

Ball Mill/Roller Block

40% suspension (4 kg pigment and 6 L water) of the raw pigment is ground with 25-mm ceramic balls on the roller block for 60 to 90 minutes.

Sand Mill:

Horizontal PU-lined sand mill with Ottawa sand or zirconia/silicate grinding beads (Rimax) with a diameter of 2.5 to 2.8 mm. There are 1 to 2 passes with 600 to 800 kg 40% suspension per hour. The temperature must be kept below 60° C.

Although a jet mill for dry pre-comminution with subsequent slurrying of the raw pigment to the 40% suspension is very effective and does not cause any wear, it is very complex and time-consuming to manage and is therefore expensive.

Corundum disc mill: Pre-comminution of the raw pigment particles into a 40% suspension has a throughput that is too low, but can be used trial-wise.

EXAMPLE 2

Step 2: Inventive Wet Grinding

The 10 kg of the 40% suspension of the nickel titanium raw pigment from Example 1 are adjusted to a pH of 6-6.5 with 10% sulfuric acid, and if necessary adjusted to conductivity of 2000 to 2500 µS/cm by adding sodium sulfate solution, in order to obtain a stable, pumpable suspension having a viscosity of 600-700 mPa*s. A Lehmann "FM 20" mill lined with a special heat-conductive ceramic material for cooling is used.

EXAMPLE 2A

Pass Grinding

The suspension is pumped through the mill 3 times, passes 1 and 2 with grinding balls (cerium-stabilized zircon oxide balls, bulk density 3.7 kg/L) 1.7 to 2.4 mm, the third pass with grinding balls 0.7 to 1.2 mm (cerium-stabilized zircon oxide balls, bulk density 3.7 kg/L) at a throughput of 600 g suspension per minute; this is equal to a dwell time of 130 to 150 sec per pass, that is, a total dwell time of 10 min. The mill is set to a circumferential speed of 12 m/sec. The grinding temperature is no more than 45° C.

EXAMPLE 2B

Circulatory Grinding with Mill Feedback 1 pass with grinding balls (cerium-stabilized zircon oxide balls, bulk density 3.7 kg/L) 1.7 to 2.4 mm (72 vol. % of the grinding space), then circulatory grinding for 30 to 60 min with a throughput of 900 g suspension per min, which equals total dwell time of 6 to 12 min and 4 to 8 theoretical passes. It is necessary to check the pH after each pass or every 30 min during circulatory grinding. If the pH rises above 6.5, it must be corrected by adding sulfuric acid. The mill is set for a circumferential speed of 11 m/sec.

After 45 minutes of milling, 20 g (0.2%) Nuosperse 2008, a fatty amine salt of an ethoxylated and partially phosphatized oleyl alcohol are added for conditioning and grinding continues for an additional 15 min. If the suspension becomes thin, the viscosity must be raised by adding no more than 50 g sodium dihydrogen phosphate, and if necessary additional sulfuric acid. The grinding temperature is no more than 45° C.

EXAMPLE 3

Adding Additives

After fine grinding in accordance with Example 2b, the pigment is washed until the conductivity of the supernatant liquid is 500 to 800 µS/cm. The suspension is concentrated by means of a centrifuge decanter or filter press to a solid content of 55 to 65%. Then additional 2.5% sodium sulfate are added to the slurry, the viscosity is adjusted to 620 Pa*s with equal parts by weight of sodium phosphate and sulfuric acid, an additional quick pass (dwell time<60 sec) through the mill is performed with grinding balls (cerium-stabilized zircon oxide balls, bulk density 3.7 kg/L) 1.7 to 2.4 mm.

An excellently hiding yellow pigment is obtained that has optimum gloss when applied in a coating. There are no detectable differences between the pigment in accordance with the method in Example 2A and in accordance with the method in Example 2B.

EXAMPLE 4

Adding Additives

After fine grinding in accordance with Example 2b, the pigment is washed until the conductivity of the supernatant liquid is 500 to 800 μS/cm. The suspension is concentrated by means of centrifuge decanter or filter press to a solid content of 60%. Then additional 3% non-ionic, modified fatty acid derivative (commercial product) and 100 g "Aerosil" are added to the slurry, and an additional quick pass (dwell time<60 sec) through the mill is performed with grinding balls (cerium-stabilized zircon oxide balls, bulk density 3.7 kg/L) 1.7 to 2.4 mm (same filling as before).

An excellently hiding yellow pigment is obtained that has optimum gloss in the coating. It is not possible to detect a feared matting effect from the Aerosil. There are no detectable differences between the pigment in accordance with the method in Example 2A and in accordance with the method in Example 2B.

EXAMPLE 5

Adding Additives

After fine grinding in accordance with Example 2b, the pigment is washed until the conductivity of the excess liquid is 500 to 800 μS/cm. The suspension is concentrated by means of centrifuge decanter or filter press to a solid content of 60%. Then additional 2% of a polydimethyl siloxane (aqueous emulsion) is added to the slurry to reduce abrasivity, in addition 35 g "aluminum oxide C" (commercial product of the Degussa Company), an additional quick pass (dwell time<60 sec) through the mill is performed with grinding balls (cerium-stabilized zircon oxide balls, bulk density 3.7 kg/L) 1.7 to 2.4 mm (same filling as before).

After separation, an excellently hiding, bright yellow pigment is obtained that has optimum gloss in the coating. There are no detectable differences between the pigment in accordance with the method in Example 2A and in accordance with the method in Example 2B.

EXAMPLE 6

Variations in the Auxiliary Agents

To illustrate how independent the pigment properties are in accordance with this invention, deviating from the wording of these examples the following auxiliary agents are used in variations that are reasonable to experts in the art without this having a significantly improving effect on the result, in contrast to DE-A-2 936 746:

Modified Fatty Acid Derivatives
1. Fatty amine salt of a polymer oleyl alcohol, ethoxylated and phosphatized, and
2. Non-ionic, modified fatty acid derivative Polysiloxane Compounds
1. With polyether group-modified siloxane
2. Alkylaryl-modified polysiloxane Nanodisperse Aluminum Oxide or Silicic Acids
Aluminum oxide C (Degussa)
Aerosils (pyrogenic nanoscale silica in a variety of specifications)
The following grinding beads can be used as grinding balls:
1.7 to 2.4 mm cerium-stabilized zircon oxide balls, bulk density 3.7 kg/L
0.7 to 1.2 mm cerium-stabilized zircon oxide balls, bulk density 3.7 kg/L
0.6 to 0.8 mm yttrium-stabilized zircon oxide balls, bulk density 3.6 kg/L
0.8 to 1.0 mm yttrium-stabilized zircon oxide balls, bulk density 2.8 kg/L
2.5 to 2.8 mm zircon silicate balls, bulk density 2.4 kg/L

EXAMPLE 7

Evaluation

After filtration and drying, a bright, highly opaque, and fine-particle yellow pigment is obtained. In comparison, the pigment in accordance with Example 4 is as follows (Table 1):

TABLE I (Mean particle size and gloss)

| | Material | | |
|---|---|---|---|
| | Commercial product A (jet-milled) | Nickel antimony rutile yellow (wet-ground) Invention | Commercial product TY-70 from Ishihara Company |
| Grinding process | Standard type jet-milled | Experiment: ceramic-lined Lehmann "FM" | |
| Mean particle size $d_{50}$ | 0.66 μm | 0.31 μm | 0.87 μm |
| Gloss 20°/60° (D65) | 29.2/71.1 | 62.5/87.9 | 40.9/78.6 |

Figure 2:
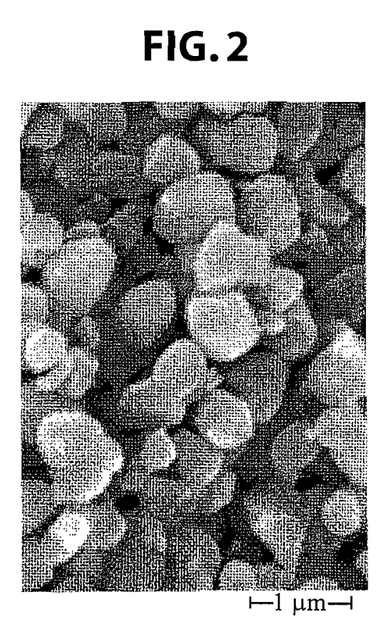
FIG. 2 is an SEM view of Ishihara-made commercial pigment TY70.

See FIG. 1 enclosed in the attachment with regard to the comparative particle size of the different products. The described commercial product A was obtained according to common multistage jet-milling methods until no more improvement could be attained. Particle shape and size may be assessed and compared in enclosed FIGS. 2, 3, and 4 in scanning electron microscopic images. The rounded polished shape that is responsible for some of the favorable application technology properties is evident.

EXAMPLE 8

Non-Voluntary Confirmation of Success for Inventive Improved Nickel Antimony Titanium Yellow Pigment The efficacy of the invention is documented primarily by the following incident, highlighted briefly and without any disturbing effects (the pigment is also resistant to leaching), during the development of the product, even though it may seem to be an unorthodox example:

Pilot production began after preliminary results from Examples 1-6 were evaluated. Because of an error in handling, small quantities of the inventive very fine nickel antimony rutile yellow pigment leaked out of the mill into the receptacle for the waste water basin (clear side). The pigment was deposited as an extremely well hiding, uniform, and intensely luminous lemon yellow coating on the walls and fittings of the waste water preparation system. The "result" looked like it had been applied with a roller or sprayed on in a clean, covering manner. The bright green substrate of the building and the various distinctly colored pipes, fixtures, and cables did not result in any yellow hue nuances in the midday sunlight. The color effect initially led one to think of doped bismuth vanadate or even lead chromate, which could not be disproved without chemical analysis. Considering that all of this occurred without auxiliary agents, the practical value of the improvement from the invention becomes quite clear.

EXAMPLE 9

Variation of the Ground Substance

Other Rutile-Based Pigments

Trial as in Examples 1 and 2A, but, instead of with nickel antimony rutile yellow, with "off-white" titanium dioxide, obtained from a synrutile using the method according to DE-A-101 03 977, which according to the method described therein, but in contrast to Example 3 of DE-A-3 202 158, is obtained directly and does not contain any more "reactive iron". A batch is produced according to Examples 1 and 2A, but a "synrutile" with 97% $TiO_2$ is used instead of a synthetic mixed phase color pigment. Similarly significant improvements result, in this case with regard to improved brightness, opacity, and gloss, which is essential in facilitating use of a "direct" "synrutile" (i.e. without refining methods, as are the chloride or sulfate process, that are common practice for $TiO_2$) for pigment applications in the sector of pastel white colors.

In the context of this invention, the qualitative evaluation furthermore leads to the conclusion that the inventive method is applicable to all hard-grain or highly agglomerated pigments that are based on titanium dioxide in a rutile structure, without having to pay a penalty for these advantages in terms of weak color for lack of adequate doping, sharply increased photoactivity, significantly increased expenditure of energy and/or non-specific graying due to metal abrasion of the mill.

EXAMPLE 10

Comparison of Measured Gloss Values for Commercial Product A, Inventive Nickel Antimony Rutile Yellow, and Ishihara TY70 Commercial Pigment, which had been Assessed in the Foregoing The measured gloss values in Table II are determined according to DIN 67 530. An alkyd melamine stoving enamel (55% solid content) was used for the testing system. For this, 80 g resin, 20 g pigment, and 120 g glass beads (2 mm) were weighed into a polypropylene beaker and shaken for 20 minutes on a Scandex shaker. The pigmented resin was applied to a white testing chart (Leneta Form WH) with a wet film thickness of 200 μm using a film drawing device (Erichsen Company, model 509 MCIII) and stoved for 30 min at 130° C. Reflectometer values were subsequently determined with standard illuminant D 65.

TABLE II (Reflectometer values)

| (Standard illuminant D65) | 20° reflectometer value | 60° reflectometer value |
|---|---|---|
| Commercial pigment A | 29.2 | 71.1 |
| Inventive product Nickel antimony rutile yellow (300 nm) | 62.5 | 87.9 |
| Ishihara TY70 commercial pigment | 40.9 | 78.3 |

EXAMPLE 11

Determining Hiding Power

Hiding power was determined according to DIN 55987 using standard light D65 (daylight, northern hemisphere, corresponding to emission radiation of the black body heated to 6504 K), in an oxidatively drying alkyd resin. For this, 70 g resin, 30 g pigment, and 120 g glass beads (2 mm) were weighed into a polypropylene beaker and shaken for 20 min on a Scandex shaker. The pigmented resin was applied to black/white contrast cards at wet film thicknesses of 60 to 400 μm using a film drawing device (Erichsen Company, model 509 MCIII) with a type 421/II Erichsen Company step rake. After the resin film was dried, the color spacing DE was determined over black and white substrates according to DIN 6174 and applied graphically against the reciprocal value of the film thickness corresponding with a color spacing DE=1.

This was determined both for the described nickel titanium pigments and for a titanium dioxide pigment for the rutile modification. The hiding power in Table III is provided relative to titanium dioxide. The concentration of the tested pigments was kept below critical pigment volume concentration (CPVK).

TABLE III (Hiding power, relative to a standard titanium dioxide rutile pigment as comparative substance)

| (Standard light D 65) | Hiding power |
|---|---|
| Commercial pigment A | 89% |
| Inventive nickel antimony rutile yellow pigment (300 nm) | 121% |
| Ishihara TY70 commercial pigment | 82% |

What is claimed is:

1. Pigment particles consisting essentially of uncoated inorganic nickel- antimony rutile yellow having a color saturation c* of 52 to 55 at a color hue angle h of 96° to 98° according to testing under DIN 5033, and a particle size distribution with a diameter range between 50 and 1000 nm, which in case of a mono-, bi-, tri- or oligomodal maxima distribution has a maximum between 230 and 430 nm, and a secondary maximum of less than 25% of the primary maximum in a diameter range between 400 and 1000 nm in case of bi- or oligomodal distribution.

2. Pigment in accordance with claim 1, wherein the mean particle diameter is between 80 and 1000 nm, and wherein a secondary maximum occurs, at less than 25% of the primary between, 400 and 900 nm.

3. Pigment in accordance with claim 2, wherein the mean particle diameter is between 120 and 600 nm.

4. Pigment in accordance with claim 1 that has an asymmetrically shaped monomodal particle size distribution for the particle diameter with a maximum between 250 and 390 nm.

5. Pigment in accordance with claim 1 that when tested in accordance with standard DIN 67 530 using standard illuminant "D65" the pigment has a 20° reflectometer gloss value of at least 42 and a 60° reflectometer value of at least 80, and a 60° reflectometer gloss value of at least 83, without requiring the use of auxiliary agents that remain on the pigment.

6. Pigment in accordance with claim 1 that when tested in accordance with DIN 55 987 using standard illuminant "D65" has a hiding power which is more than 100% relative to a standard titanium dioxide futile pigment as a comparative substance tested under the same conditions.

7. Pigment in accordance with claim 5, wherein the covering power in accordance with DIN 55987 is between 115 and 130%.

8. Process to manufacture a pigment in accordance with claim 1 wherein an inorganic mixed phase oxide pigment with rutile structure is treated by means of high-speed milling of its aqueous suspension in an agitator ball mill with resistant lining until a desired particle size distribution has been attained.

9. The method in accordance with claim 8, wherein the milling device and the grinding tools are equipped with a wear-resistant and inert coating.

10. The method in accordance with claim 8 wherein iron-free and resistant grinding beads with a diameter of about 0.2 to 1.7 mm, are used in said grinding unit.

11. The method in accordance with claim 8 wherein the grinding is Performed at temperatures between about 20 and 90° C.

12. Method in accordance with claim 8 wherein the grinding is performed using a recirculation flow system, the mean dwell time of the ground material in the agitator ball mill being 4 to 44 min.

13. Method in accordance with claim 8 wherein the perimeter speed of the rotor in said agitator ball mill is 5 to 19 m/s.

14. Method in accordance with claim 8 wherein the filling level of said agitator ball mill with grinding bodies is about 60 to 90 vol. %.

15. Method in accordance with claim 8 wherein pre-comminution occurs upstream of said method in a ball mill made of resistant material which prevents the ground material from coming into contact with metal.

16. Method in accordance with claim 15, wherein said resistant material is a heat-conductive and wear-resistant material.

17. Method in accordance with claim 15, wherein said resistant material is a heat-conductive ceramic material.

18. Method in accordance with claim 8 wherein said resistant lining material for said agitator ball mill is an inert and wear-resistant plastic or an inert and wear-resistant ceramic material.

19. Pigment in accordance with claim 2 wherein the mean particle diameter is between 80 and 600 nm.

20. Pigment in accordance with claim 4 wherein the particle diameter has a maximum between 280 and 340 nm.

21. Pigment in accordance with claim 5 wherein the 20° reflectometer gloss value is at least 50.

22. Pigment in accordance with claim 21 wherein the 20° reflectometer gloss value is in the range from 55 to 70.

23. Pigment in accordance with claim 5 wherein the 60° reflectometer gloss value is in the range from 83 to 95.

24. Pigment in accordance with claim 6 wherein the hiding power is more than 110%.

25. Pigment in accordance with claim 1 that is made by the process wherein aft inorganic mixed phase oxide pigment particles with rutile structure are treated by means of milling of its aqueous suspension in an agitator ball mill with resistant lining until a desired particle size distribution has been attained.

26. Pigment in accordance with claim 2 that when tested in accordance with standard DIN 67 530 using standard illuminant "D65" the pigment has a 20° reflectometer gloss value of at least 42 and a 60° reflectometer value of at least 80, and a 60° reflectometer gloss value of at least 83, without requiring the use of auxiliary agents that remain on the pigment.

27. Pigment in accordance with claim 3 that when tested in accordance with standard DIN 67 530 using standard illuminant "D65" the pigment has a 20° reflectometer gloss value of at least 42 and a 60° reflectometer value of at least 80, and a 60° reflectometer gloss value of at least 83, without requiring the use of auxiliary agents that remain on the pigment.

28. Pigment in accordance with claim 4 that when tested in accordance with standard DIN 67 530 using standard illuminant "D65" the pigment has a 20° reflectometer gloss value of at least 42 and a 60° reflectometer value of at least 80, and a 60° reflectometer gloss value of at least 83, without requiring the use of auxiliary agents that remain on the pigment.

* * * * *